United States Patent [19]
Hakogi et al.

[11] Patent Number: 5,283,842
[45] Date of Patent: Feb. 1, 1994

[54] OPERATING POINT TRIMMING METHOD FOR OPTICAL WAVEGUIDE MODULATOR AND SWITCH

[75] Inventors: Hironao Hakogi, Kawasaki; Hisashi Takamatsu, Yokohama, both of Japan

[73] Assignee: Fujitsu Limited, Kawasaki, Japan

[21] Appl. No.: 666,051

[22] Filed: Mar. 7, 1991

[30] Foreign Application Priority Data

Mar. 8, 1990 [JP] Japan .................................. 2-54976

[51] Int. Cl.$^5$ .............................................. G02B 6/10
[52] U.S. Cl. ............................................. 385/3; 385/21; 385/40
[58] Field of Search ............... 350/96.11, 96.12, 96.13, 350/96.14; 385/1-3, 15, 16, 20, 21, 39, 40, 41, 42

[56] References Cited

U.S. PATENT DOCUMENTS

| | | | |
|---|---|---|---|
| 4,262,992 | 4/1981 | Berthold, III | 350/96.14 |
| 4,300,814 | 11/1981 | Carenco | 385/2 |
| 4,677,290 | 6/1987 | Mitch | 385/90 |
| 4,709,978 | 12/1987 | Jackel | 385/3 |
| 4,720,163 | 1/1988 | Goodwin et al. | 385/90 |
| 4,744,626 | 5/1988 | Mery | 385/90 |
| 4,899,042 | 2/1990 | Falk et al. | 250/227 |
| 4,955,977 | 9/1990 | Dao et al. | 350/96.34 |
| 4,991,921 | 2/1991 | Suzuki et al. | 350/96.14 |

FOREIGN PATENT DOCUMENTS

1-077002 12/1989 Japan .
2042212A 9/1980 United Kingdom .................. 382/2

OTHER PUBLICATIONS

Mikami et al., "Coupling-length adjustment for an optical directional coupler as a 2×2 switch", *Applied Physics Letters*, pp. 38-40, Jul. 1, 1979.

Haga et al., "Precise control of phase constant of optical guided wave devices by loading langmuir-blodgett films", *Journal of Lightwave Technology*, pp. 1024-1027, Jun., 1988.

Ahmed et al., "Mach-zehnder interferometer tuning with $Ta_2O_5$ film loading", *Applied Optics*, pp. 4082-4087, Dec. 15, 1983.

Minakata, Makoto, "Efficient $LiNbO_3$ balanced bridge modulator/switch with an ion-etched slot", *Applied Physics Letters*, pp. 40-42, Jul., 1979.

*Primary Examiner*—Frank Gonzalez
*Attorney, Agent, or Firm*—Staas & Halsey

[57] ABSTRACT

Operating point trimming methods for an optical waveguide modulator and an optical waveguide switch are disclosed. One operating point trimming method for an optical waveguide modulator comprises, for example, the step of removing, while monitoring the waveform of an intensity modulated light beam, a portion of either one of a first and a second electrode such that the intensity modulated waveform takes on a desired waveform. One operating point trimming method for an optical waveguide switch comprises the step of removing a portion of either one of a first and a second electrode while monitoring output light beams.

12 Claims, 7 Drawing Sheets

OPERATING POINT TRIMMING METHOD FOR OPTICAL WAVEGUIDE MODULATOR AND SWITCH

BACKGROUND OF THE INVENTION

The present invention relates to operating point trimming methods for an optical waveguide modulator and an optical waveguide switch.

In a general optical communication system, a light signal intensity modulated on the transmitter side is transmitted to the receiver side through an optical transmission line formed of an optical fiber or the like, and the signal is directly detected and the transmitted information is reproduced on the receiver side. The intensity modulation may be performed on the transmitter side by having the drive current of a light source, which is formed for example of a semiconductor laser, modulated with a modulating signal (direct modulation). In the case of the direct modulation, however, there sometimes occurs a relatively large wavelength shift (chirping) when high speed modulation is performed. Therefore, when an optical fiber whose dispersion characteristic is not good is used as the optical transmission line, the transmission is restricted in the transmission distance or the transmission speed. More specifically, when a system is structured with a combination of a single mode optical fiber exhibiting zero dispersion at 1.3 μm band and a semiconductor laser oscillating at 1.55 μm band minimizing the transmission loss, the system has restriction of the transmission distance or the transmission speed due to the wavelength dispersion. As a means for removing such restriction on the transmission distance or transmission speed, there is an external modulation system using an optical modulator. The external modulation system is a system in which a light beam emitted from a light source at the level of constant intensity is modulated by, for example, an optical waveguide modulator provided independently of the light source and, with which, a system producing an extremely small quantity of wavelength chirping can be formed. In implementing such external modulation system, it is desired that a trimming method for controlling the operating point of the optical waveguide modulator is provided.

FIG. 1 is a plan view showing a structure of a conventional optical waveguide modulator 1.

Referring to FIG. 1, reference numeral 2 denotes a waveguide substrate in a parallelepiped form made from a ferroelectric material such as lithium niobate (LiNbO$_3$). At a predetermined position on the surface of the waveguide substrate 2, there is formed, by such a method as thermal diffusion of titanium (Ti), an optical waveguide 3 having a first branch optical waveguide 3a and a second branch optical waveguide 3b of the same length and in the form of a combined two Y-branch waveguides. On the surface of the waveguide substrate 2, there is further formed a buffer layer 4 of a silicon dioxide (SiO$_2$) film for covering all of the optical waveguides 3, 3a, and 3b.

Over the first branch optical waveguide 3a, there is formed, through the buffer layer 4, a first electrode 5a for applying the driving voltage, provided by plating of a conductive material such as gold, and over the second branch optical waveguide 3b, there is formed, through the buffer layer 4, a second electrode 5b. One end of both the first and second electrodes 5a and 5b are connected with a drive circuit (not shown) for changing the voltages applied to the electrodes 5a and 5b according to the modulating signal and the other ends thereof are connected with terminating resistors (not shown). One end portion of the optical waveguide 3 is optically coupled on the waveguide substrate 2 with an optical fiber 6 on the input side as indicated by the arrow and the other end portion thereof is optically coupled with an optical fiber 7 on the output side. The buffer layer 4 is provided so that the light beams propagating through the first and second branch optical waveguides 3a and 3b may not be absorbed by the first and second electrodes 5a and 5b.

With the described arrangement, the refractive indexes of the first and second branch optical waveguides 3a and 3b of the optical waveguide 3 are changed according to the electric fields applied thereto and, hence, the respective branch beams branched by the branch optical waveguides 3a and 3b in phase will suffer phase changes according to the refractive indexes of the respective branch optical waveguides 3a and 3b.

Since, except for the Y-branch portions, the optical waveguide 3 is arranged to be a single mode optical waveguide which propagates only the light beam of the fundamental mode, the intensity of the interference light output from the optical waveguide 3 becomes a maximum when the phase difference between the branch light beams is zero, whereas the intensity of the interference light becomes a minimum when the phase difference between the branch light beams is $\pi$. Further, when the phase difference is between 0 and $\pi$, the interference light takes on an intensity corresponding to the phase difference. In the described manner, the optical waveguide modulator 1 provides time-series changes to the output light intensity by changing the voltages applied to the electrodes according to the modulating signal.

FIG. 2 shows the relationship between the applied voltage and the output light intensity. In the diagram, the output light intensity is indicated along the axis of ordinate and the applied voltage is indicated along the axis of abscissa.

The relationship between the applied voltage V to the Y-branch interferometric optical modulator and the output light intensity $P_o$, under the conditions that either a TE mode wave or a TM mode wave is used, that the propagating light is equally divided and combined at the Y-branches suffering no loss, and that the wave guide has no loss, is expressed as $$P_o = P_i \cdot \cos^2[(\pi/2)\cdot(V/V\pi) + \theta],$$

where Pi represents the input light intensity and V$\pi$, called the half-wave length voltage, represents the minimum voltage difference providing the maximum output and the minimum output.

The angle $\theta$ becomes 0 when the optical path difference between the two waveguide paths 3a and 3b equals 0 or $\lambda$ (wavelength of the propagating light)/n (the refractive index of the medium for the propagating light) multiplied by 2 k (k = ±1, ±2, ...). The solid line 10 in FIG. 2 shows the case where the angle $\theta$ = 0.

In such modulator, the intensity modulation can be achieved by changing the voltage between the applied voltage V$_1$ (V$_3$) providing a maximum of the light intensity and the applied voltage V$_2$ (V$_4$) providing a minimum of the light intensity. For example, when performing digital modulation, the applied voltage may be set to $V_1$ at the mark period 10a corresponding to "1" and the applied voltage may be set to $V_2$ at the space period 10b corresponding to "0".

In the described optical waveguide modulator 1, the refractive indexes of the first and second branch optical waveguides 3a and 3b are changed by stress exerted thereon from the buffer layer 4 and the electrodes 5a and 5b disposed on the waveguide substrate 2 and, as a result, the optical path lengths of these waveguides become different, leading to a shift of the operating point.

When the operating point is shifted as described above, the desired waveform 10 is shifted to the position of the waveform 11 as indicted in FIG. 2 by the broken line. More specifically, the waveform is shifted by the shift amount $\delta V$ corresponding to the operating point shifting. In order to compensate for this shift, it is required that a DC bias voltage is applied to the electrodes 5a and 5b to change the refractive indexes of the branch optical waveguides 3a and 3b and adjust the optical path difference therebetween.

The shift amount $\delta V$ due to the operating point shifting differs from product to product because of lack of uniformity of the thickness of the evaporation film of the buffer layer etc. and of the size of various parts occurring in the course of fabrication. Such tendency is especially remarkable with optical waveguide modulators using, as the waveguide substrate, $LiNbO_3$ having the photoelastic effect. Therefore, it becomes necessary to apply each optical modulator with the DC bias voltage corresponding to the operating point shift amount $\delta V$ due to the operating point shifting resulted from the above described lack of uniformity to thereby adjust the DC offset. Further, even if the shift amount $\delta V$ is compensated for by taking the above measure, there sometimes occurs, when such DC bias voltage is applied, a phenomenon called DC drift in which the operating point shifts with the lapse of time after the application of the DC bias voltage. This phenomenon for example is such, as shown in FIG. 3, that the waveform 10 adjusted to a desired output light intensity by application of a DC bias tends to shift to the waveform 12 indicated by the broken line.

When such a shift occurs, the applied voltage $V_1$ providing the maximum light output is shifted to $V_1'$, as shown in FIG. 3, while the applied voltage $V_2$ providing the minimum light output is shifted to $V_2'$. Therefore, if the modulation is performed with the applied voltages $V_1$-$V_2$ whereby the original waveform 10 was obtained, the output light intensity when the applied voltage is $V_1$ decreases from 10a to 10b as shown in the same diagram, while the output light intensity 12a when the applied voltage is $V_2$ increases from 12a to 12b. As a result, it becomes impossible to obtain the maximum and minimum output light beams and the extinction ration (the ratio of the output light intensity in the mark period to that in the space period given in decibels) is decreased, and a problem is presented that it becomes unable to have a suitable optical signal output.

When it is attempted to obtain optical waveguide modulators having no operating point shifting such as the DC drift, since some nonuniformity of the operating point occurs in the fabrication process, it becomes necessary to select such products that have virtually equal operating point shiftings after fabrication thereof. This is indeed a difficult task in view of the fact that the nonuniformity of the operating point shifting is frequently produced in the fabrication process, and because of which, a problem is presented of a lowering of the yield rate.

SUMMARY OF THE INVENTION

Accordingly, an object of the present invention is to provide an operating point trimming method for an optical waveguide modulator, whereby the refractive index of one optical waveguide of a pair of branch optical waveguides is changed with respect to that of the other one so that the operating point is shifted to a voltage not causing the difficulty of the DC drift.

Another object of the present invention is to provide an operating point trimming method for an optical waveguide switch, whereby the refractive index of one optical waveguide of a pair of independent optical waveguides is changed with respect to that of the other one so that the operating point is shifted to a voltage not causing the difficulty of the DC drift.

A further object of the present invention is to provide a method of fabricating an optical waveguide modulator or an optical waveguide switch, in which the operating point is suitably shifted so that the yield rate is improved.

According to the present invention, the following operating point trimming methods (a)-(j) are provided for use in an optical waveguide modulator in which the voltage applied between a first electrode and a second electrode mounted on a first and a second branch optical waveguide is changed so that a phase difference is produced between the light beams guided thereby and the light beams thus caused to have the phase difference are combined so that an intensity modulated light beam is output from the optical waveguide modulator.

(a) While the waveform of the described intensity modulated light beam is monitored with a waveform display device, a portion of either one of the first and the second electrode is removed such that the waveform of the intensity modulated light beam takes on a desired waveform.

(b) While the waveform of the described intensity modulated light beam is monitored with a waveform display device, a metallic material is deposited by evaporation on the buffer layer over a portion of either one of the first and the second optical waveguide, with the electrode not mounted thereon, such that the waveform of the intensity modulated light beam takes on a desired waveform.

(c) While the waveform of the described intensity modulated light beam is monitored with a waveform display device, the buffer layer over a portion of either one of the first and the second optical waveguide, with the electrode not mounted thereon, is cut away such that the waveform of the intensity modulated light beam takes on a desired waveform.

(d) While the waveform of the described intensity modulated light beam is monitored with a waveform display device, a material increasing or decreasing the refractive index of the optical waveguide is deposited, from the top face of the buffer layer, into a portion of either one of the first and the second optical waveguide, with the electrode not mounted thereon, such that the waveform of the intensity modulated light beam takes on a desired waveform.

(e) While the waveform of the described intensity modulated light beam is monitored with a waveform display device, a portion of either one of the first and the second optical waveguide, with the electrode not mounted thereon, is externally heated to be deformed, through the buffer layer, such that the waveform of the intensity modulated light beam takes on a desired waveform.

(f) While the waveform of the described intensity modulated light beam is monitored with a waveform display device, a block for applying stress is attached to the side face of the waveguide substrate, mechanical stress is applied to the block, and the block is fixed up when the applied mechanical stress has reached a state where the waveform of the intensity modulated light beam takes on a desired waveform, such that the state is maintained.

(g) While the waveform of the described intensity modulated light beam is monitored with a waveform display device, a portion at the side of the waveguide substrate is cut off such that the waveform of the intensity modulated light beam takes on a desired waveform.

(h) The buffer layer is removed at a plurality of portions thereof over either one of the first and the second optical waveguide, with the electrode not mounted thereon, and then, while the waveform of the described intensity modulated light beam is monitored with a waveform display device, a material having a different refractive index from the refractive index of the optical waveguide is deposited on the plurality of portions of the buffer layer that have been removed such that the waveform of the intensity modulated light beam takes on a desired waveform.

(i) A metallic material is deposited by evaporation on the buffer layer over a plurality of portions of either one of the first and the second optical waveguide, with the electrode not mounted thereon, so that a plurality of independent metallic films are formed and, then, while the waveform of the described intensity modulated light beam is monitored with a waveform display device, the plurality of the metallic films are removed one after another such that the waveform of the intensity modulated light beam takes on a desired waveform.

(j) A gap is formed in a portion of either one of the first and the second optical waveguide, with the electrode not mounted thereon, and, then, while the waveform of the described intensity modulated light beam is monitored with a waveform display device, a material with different refractive index from the refractive index of the optical waveguide is filled into the gap such that the waveform of the intensity modulated light beam takes on a desired waveform.

It is preferred that optical fibers for inputting and outputting an optical signal are fixed to the optical waveguide modulator and this optical waveguide modulator is fixed to a member with a predetermined set of peripheral circuits attached thereto and, then, the operating point trimming is carried out according to any of the above described methods (a)–(j).

The operating point of an optical waveguide switch can also be trimmed by any of the methods (a)–(j).

The above and other objects, features and advantages of the present invention and the manner of realizing them will become more apparent, and the invention itself will best be understood from a study of the following description and appended claims, with reference had to the attached drawings showing some preferred embodiments of the invention.

DESCRIPTION OF THE PREFERRED EMBODIMENTS

Figure 1:
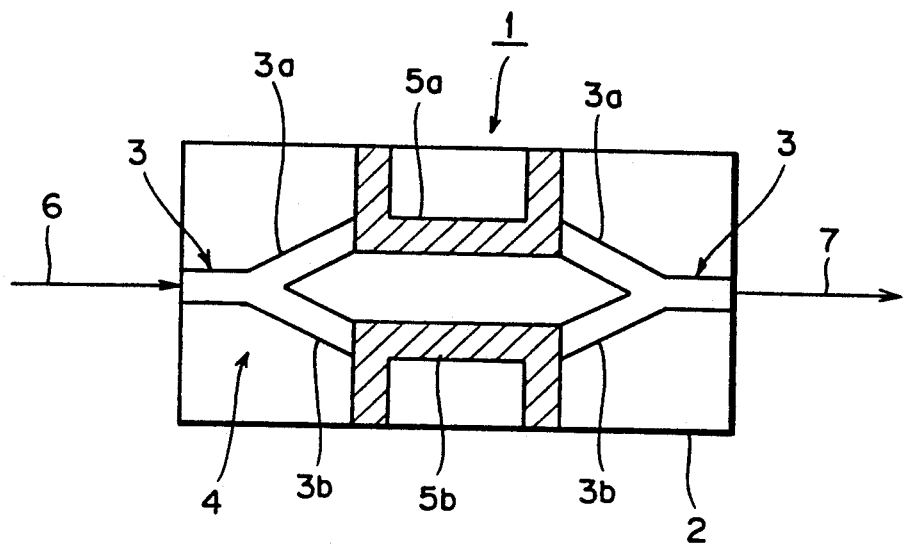
FIG. 1 is a plan view showing structure of a conventional optical waveguide modulator.
Figure 2:
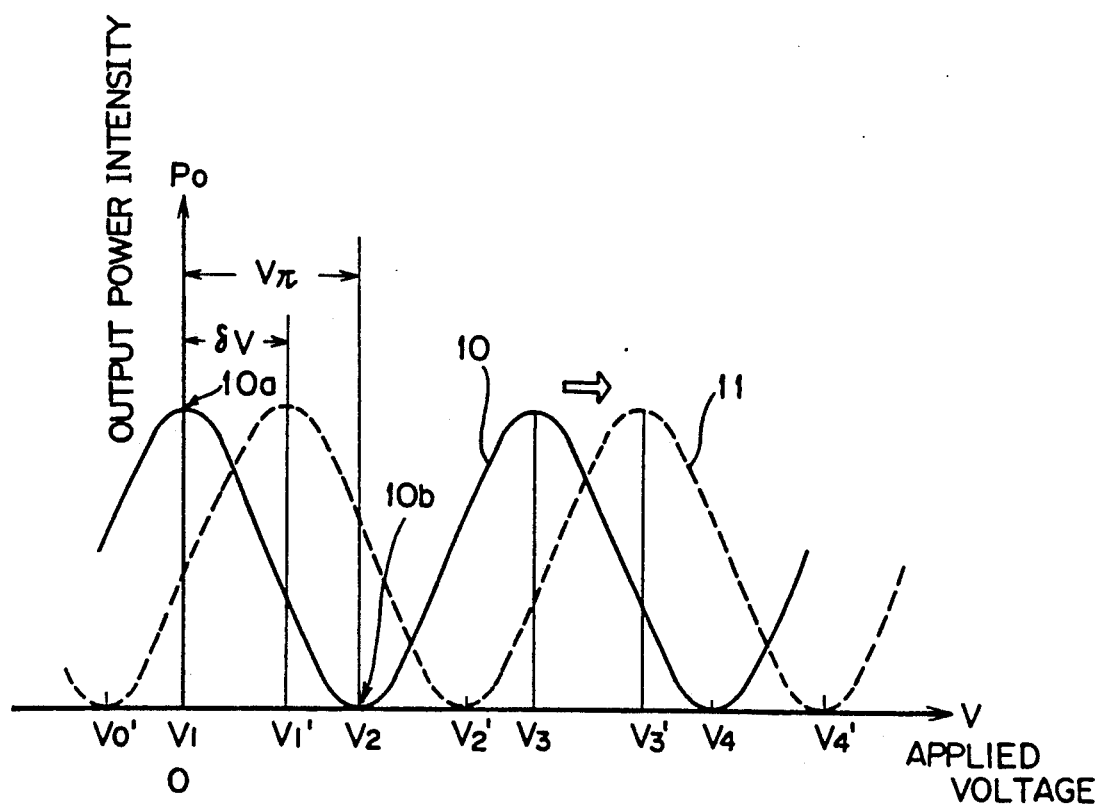
FIG. 2 is a diagram for explaining an operating point offset.
Figure 3:
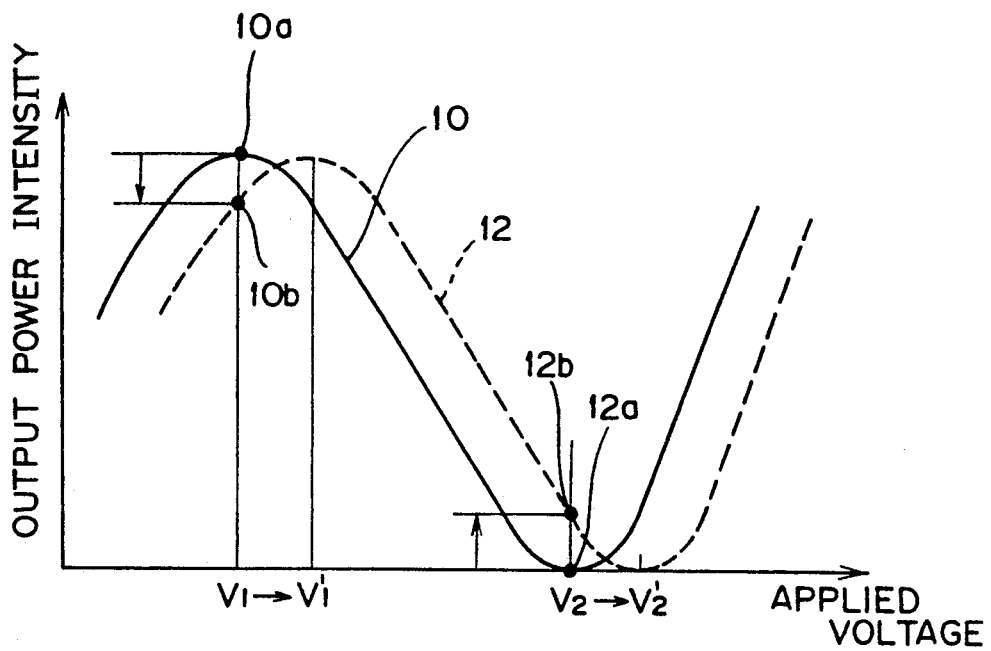
FIG. 3 is a diagram for explaining a DC drift.
Figure 4:
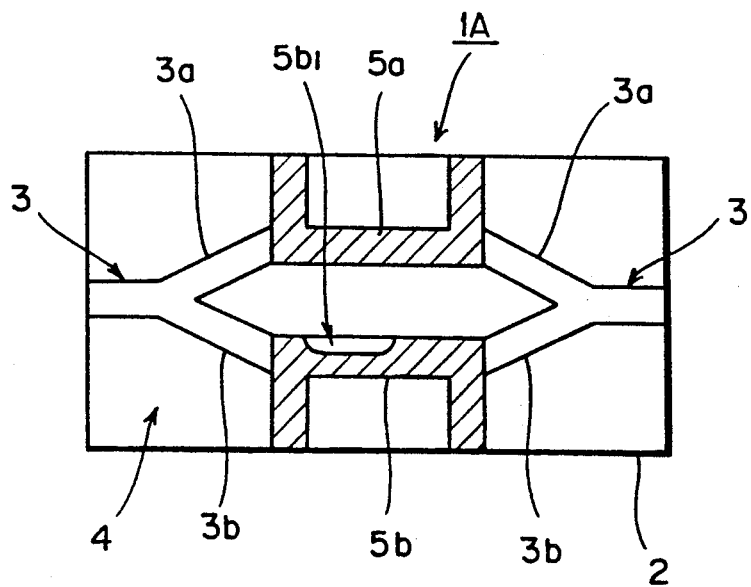
FIG. 4 is a plan view of an optical waveguide modulator for explaining an operating point trimming method as a first embodiment of the present invention.

Embodiments of the present invention will now be described below with reference to the accompanying drawings. FIG. 4 is a plan view showing the structure of an optical waveguide modulator 1A according to the first embodiment of the present invention, in which parts corresponding to the parts in the prior art example shown in FIG. 1 are denoted by like reference numerals. Accordingly, explanation thereof will be omitted.

As shown in FIG. 4, the point of the optical waveguide modulator 1A according to the first embodiment differing from that of the conventional optical waveguide modulator 1 shown in FIG. 1 is that a portion $5b_1$ of the second electrode 5b is removed so that the second electrode is changed in its form and hence the stress exerted on the second branch optical waveguide 3b is changed, whereby the refractive index of the second branch optical waveguide 3b is changed and the optical path difference between the same and the first branch optical waveguide 3a is adjusted. As a result, the trimming for bringing the operating point of the optical waveguide modulator 1A to a desired operating point is achieved and the need for applying the DC bias voltage for compensating for the DC offset described as related to the prior art example is eliminated.

More specifically, in performing such operating point trimming, the optical waveguide modulator 1 (refer to FIG. 1) is fabricated and, then, the optical waveguide modulator 1 is connected to a waveform monitoring device such as an oscilloscope, which is not shown.

Then, while the intensity modulated waveform of the light signal output from the optical waveguide modulator 1 is monitored with the waveform monitoring device, a predetermined portion of the second electrode 5b of the optical waveguide modulator 1 is removed by a laser beam thereby having the portion heated and removed until the waveform of the light signal takes on a desired waveform. Thus, the optical waveguide modulator 1A as described above can be obtained.

Although a portion of the second electrode 5b was removed in the above described optical waveguide modulator 1A, a portion of the first electrode 5a may be removed depending on the refractive indexes of the branch optical waveguides 3a and 3b.

With the described optical waveguide modulator 1A, the need for applying the DC bias voltage as was necessary in the conventional optical waveguide modulator 1 can be eliminated. Further, since the DC bias is not applied to the same, the DC drift usual with the prior art does not occur.

Figure 5:
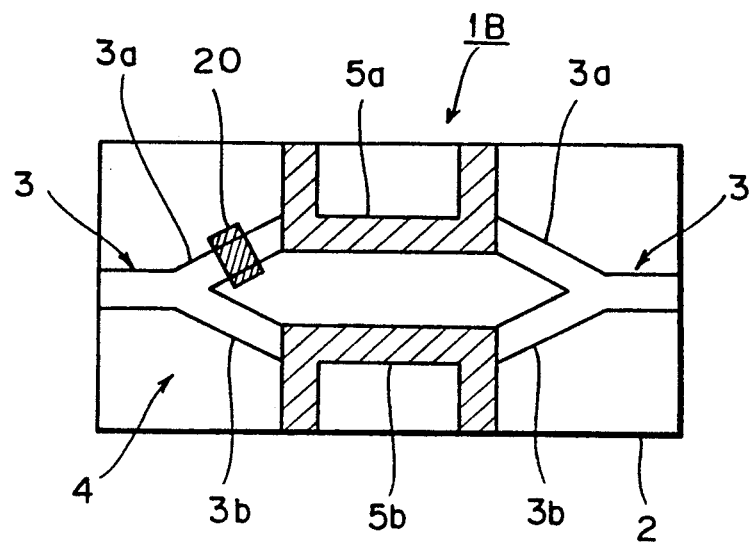
FIG. 5 is a plan view of an optical waveguide modulator for explaining an operating point trimming method as a second embodiment of the present invention.

Now, referring to FIG. 5, a second embodiment of the present invention will be described. FIG. 5 is a plan view showing the structure of an optical waveguide modulator 1B according to the second embodiment of the present invention, in which parts corresponding to the parts in the prior art example shown in FIG. 1 are denoted by like reference numerals. Accordingly, explanation thereof will be omitted.

As shown in FIG. 5, the point of the optical waveguide modulator 1B according to the second embodiment differing from that of the conventional optical waveguide modulator 1 is that a metallic film 20 is formed on the buffer layer 4 over the first branch optical waveguide 3a, whereby the light beam propagating through the first branch optical waveguide 3a when traveling past the portion of the metallic film 20 senses the refractive index of the metallic film 20 and the refractive index of the first branch optical waveguide 3a is substantially changed and, accordingly, the optical path length of the first branch optical waveguide 3a is changed and the optical path difference between the same and the second branch optical waveguide 3b is adjusted, and thus the trimming for bringing the operating point of the optical waveguide modulator 1B to a desired operating point is achieved, and the need for applying the DC bias voltage for compensating for the DC offset described as related to the prior art example is eliminated.

More specifically, in performing such operating point trimming, the optical waveguide modulator 1 (refer to FIG. 1) is fabricated and, then, the optical waveguide modulator 1 is connected to a waveform monitoring device such as an oscilloscope. Then, while the intensity modulated waveform of the light signal output from the optical waveguide modulator 1 is monitored with the waveform monitoring device, a metallic material is deposited by evaporation on the buffer layer 4, to form the metallic film 20, over the first branch optical waveguide 3a until the waveform of the light signal takes on a desired waveform. Thus, the optical waveguide modulator 1B as described above can be obtained, and therefrom, the same effects as obtained from the above described optical waveguide modulator 1A can be obtained.

Although the metallic layer 20 was formed over the first branch optical waveguide 3a through the buffer layer 4 in the above described optical waveguide modulator 1B, the metallic layer 20 may be formed over the second branch optical waveguide 3b depending on the refractive indexes of the branch optical waveguides 3a and 3b. That is, the metallic film 20 may be formed at a portion over the branch optical waveguides 3a and 3b except for the portions where the electrodes 5a and 5b are formed or mounted.

Figure 6:
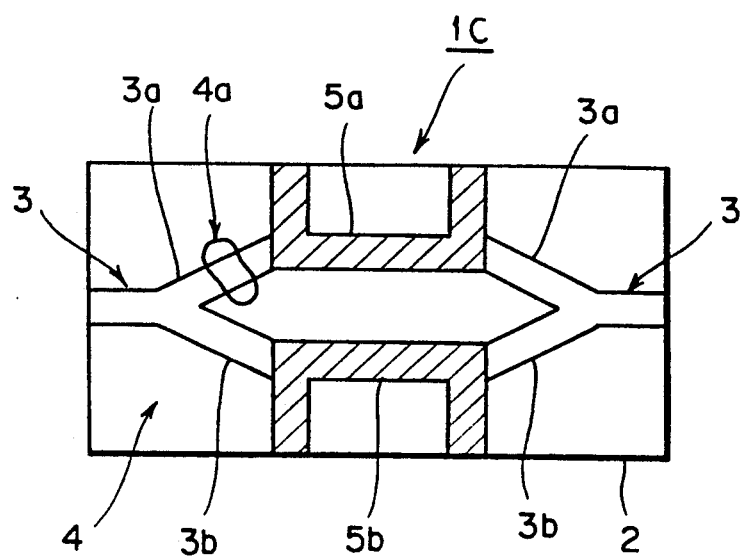
FIG. 6 is a plan view of an optical waveguide modulator for explaining an operating point trimming method as a third embodiment of the present invention.

Now, referring to FIG. 6, a third embodiment of the present invention will be described. FIG. 6 is a plan view showing the structure of an optical waveguide modulator 1C according to the third embodiment of the present invention, in which parts corresponding to the parts in the prior art example shown in FIG. 1 are denoted by like reference numerals. Accordingly, explanation thereof will be omitted.

As shown in FIG. 6, point of the optical waveguide modulator 1C according to the third embodiment differing from that of the conventional optical waveguide modulator 1 is, as shown in FIG. 6, that a portion 4a of the buffer layer 4 over the first branch optical waveguide 3a is removed, so that the first branch optical waveguide 3a at the position where the buffer layer 4 is removed changes its refractive index by contacting with the air, whereby the optical path length of the first branch optical waveguide 3a is changed and the optical path difference between the same and the second branch optical waveguide 3b is adjusted, and thus the trimming for bringing the operating point of the optical waveguide modulator 1C to a desired operating point is achieved, and the need for applying the DC bias voltage for compensating for the DC offset described as related to the prior art example is eliminated.

More specifically, in performing such operating point trimming, the optical waveguide modulator 1 (refer to FIG. 1) is fabricated and, then, the optical waveguide modulator 1 is connected to a waveform monitoring device such as an oscilloscope. Then, while the intensity modulated waveform of the light signal output from the optical waveguide modulator 1 is monitored with the waveform monitoring device, the buffer layer 4 over a portion of the first branch optical waveguide 3a is removed by a method such as etching, grinding, or irradiation of an electron beam until the waveform of the light signal takes on a desired waveform. Thus, the optical waveguide modulator 1C as described above can be obtained, and therefrom, the same effects as obtained from the above described optical waveguide modulator 1A can be obtained.

Although a portion of the buffer layer 4 over the first branch optical waveguide 3a was removed in the above described optical waveguide modulator 1C, it sometimes is better to remove a portion of the buffer layer 4 over the second branch optical waveguide 3b depending on the refractive indexes of the branch optical waveguides 3a and 3b. That is, the buffer layer 4 may be removed at a portion over the branch optical waveguides 3a and 3b except for the portions where the electrodes 5a and 5b are formed or mounted.

Figure 7:
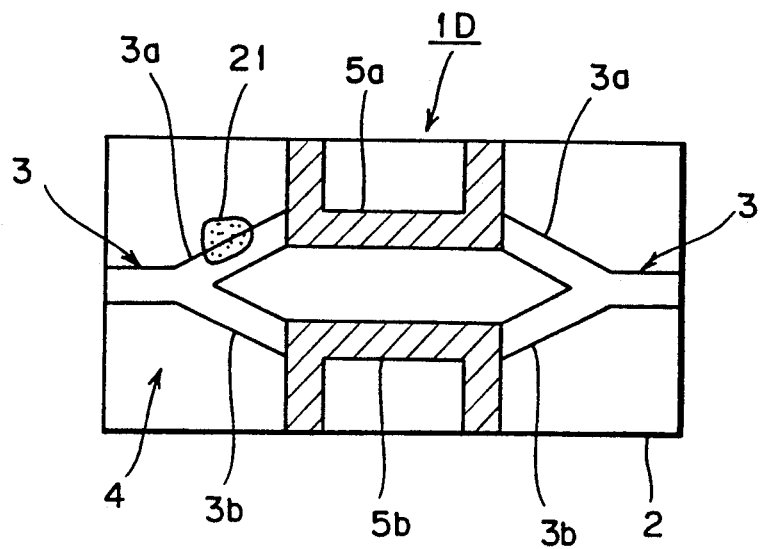
FIG. 7 is a plan view of an optical waveguide modulator for explaining an operating point trimming method as a fourth embodiment of the present invention.

Now, referring to FIG. 7, a fourth embodiment of the present invention will be described. FIG. 7 is a plan view showing the structure of an optical waveguide modulator 1D according to the fourth embodiment of the present invention, in which parts corresponding to the parts in the prior art example shown in FIG. 1 are denoted by like reference numerals. Accordingly, explanation thereof will be omitted.

As shown in FIG. 7, the point of the optical waveguide modulator 1D according to the fourth embodiment differing from that of the conventional optical waveguide modulator 1 is that a material 21 increasing or decreasing the refractive index of the optical waveguide is attached to a portion on the first branch optical waveguide 3a so that the refractive index of the first branch optical waveguide 3a is changed, whereby the optical path difference between the same and the second branch optical waveguide 3b is adjusted, and thus the trimming for bringing the operating point of the optical waveguide modulator 1D to a desired operating point is achieved, and the need for applying the DC bias voltage for compensating for the DC offset described as related to the prior art example is eliminated.

More specifically, in performing this operating point trimming, the optical waveguide modulator 1 (refer to FIG. 1) is fabricated and, then, the optical waveguide modulator 1 is connected to a waveform monitoring device such as an oscilloscope. Then, while the intensity modulated waveform of the light signal output from the optical waveguide modulator 1 is monitored with the waveform monitoring device, a material 21 increasing or decreasing the refractive index of the optical waveguide is injected by such a method as ion injection into a portion on the first branch optical waveguide 3a until the waveform of the light signal takes on a desired waveform. Thus, the optical waveguide modulator 1D as described above can be obtained, and therefrom, the same effects as obtained from the above described optical waveguide modulator 1A can be obtained.

Although a material 21 increasing or decreasing the refractive index of the optical waveguide is attached to a portion on the first branch optical waveguide 3a in the optical waveguide 1D, it may be attached to a portion on the second branch optical waveguide 3b instead.

Figure 8:
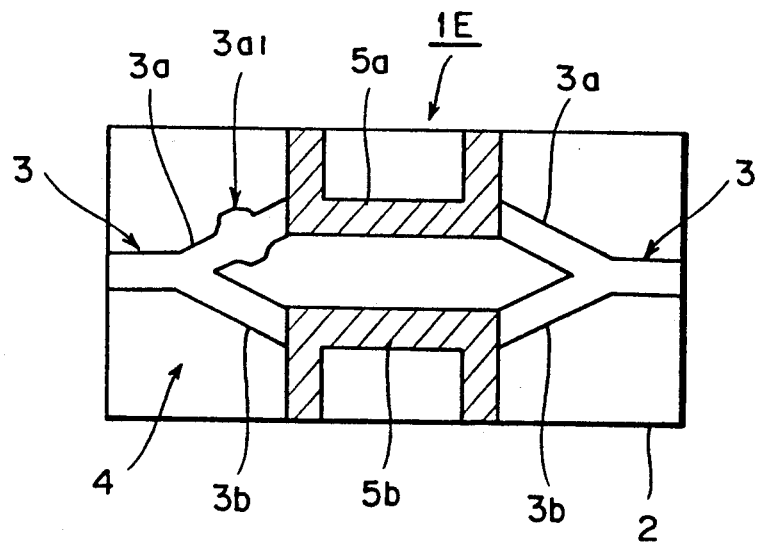
FIG. 8 is a plan view of an optical waveguide modulator for explaining an operating point trimming method as a fifth embodiment of the present invention.

Now, referring to FIG. 8, a fifth embodiment of the present invention will be described. FIG. 8 is a plan view showing the structure of an optical waveguide modulator 1E according to the fifth embodiment of the present invention, in which parts corresponding to the parts in the prior art example shown in FIG. 1 are denoted by like reference numerals. Accordingly, explanation thereof will be omitted.

As shown in FIG. 8, the point of the optical waveguide modulator 1E according to the fifth embodiment differing from that of the conventional optical waveguide modulator 1 is that a portion $3a_1$ of the first branch optical waveguide 3a is deformed so that the refractive index of the optical waveguide 3a is changed, whereby the optical path difference between the same and the second branch optical waveguide 3b is adjusted, and thus the trimming for bringing the operating point of the optical waveguide modulator 1E to a desired operating point is achieved, and the need for applying the DC bias voltage for compensating for the DC offset described as related to the prior art example is eliminated.

More specifically, in performing this operating point trimming, the optical waveguide modulator 1 (refer to FIG. 1) is fabricated and, then, the optical waveguide modulator 1 is connected to a waveform monitoring device such as an oscilloscope. Then, while the intensity modulated waveform of the light signal output from the optical waveguide modulator 1 is monitored with the waveform monitoring device, a portion $3a_1$ or the portion surrounding it on the first branch optical waveguide 3a is heated by a heating means such as a laser beam so that the first branch optical waveguide 3a is deformed by diffusion until the waveform of the light signal takes on a desired waveform. Thus, the optical waveguide modulator 1E as described above can be obtained, and therefrom, the same effects as obtained from the above described optical waveguide modulator 1A can be obtained.

Although a portion on the first branch optical waveguide 3a was deformed in the optical waveguide 1E, a portion on the second branch optical waveguide 3b may be deformed instead.

Figure 9:
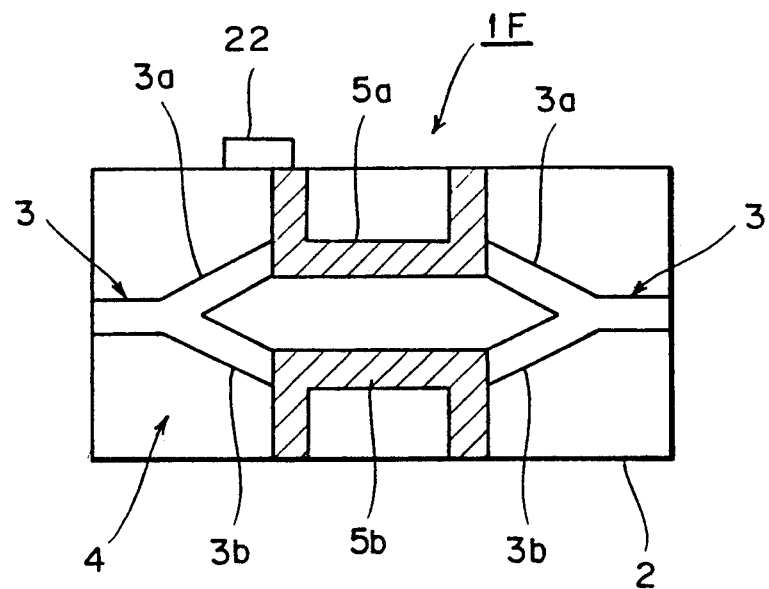
FIG. 9 is a plan view of an optical waveguide modulator for explaining an operating point trimming method as a sixth embodiment of the present invention.

Now, referring to FIG. 9, a sixth embodiment of the present invention will be described. FIG. 9 is a plan view showing the structure of an optical waveguide modulator 1F according to the sixth embodiment of the present invention, in which parts corresponding to the parts in the prior art example shown in FIG. 1 are denoted by like reference numerals. Accordingly, explanation thereof will be omitted.

As shown in FIG. 9, the point of the optical waveguide modulator 1F according to the sixth embodiment differing from that of the conventional optical waveguide modulator 1 is that a block 22 for applying stress is fixed to a portion on the side face of the waveguide substrate 2, the refractive index of the optical waveguide 3a is changed by the stress applied thereon and the optical path difference between the same and the second branch optical waveguide 3b is adjusted, and thus the trimming for bringing the operating point of the optical waveguide modulator 1F to a desired operating point is achieved, and the need for applying the DC bias voltage for compensating for the DC offset described as related to the prior art example is eliminated.

More specifically, in performing such operating point trimming, the optical waveguide modulator 1 (refer to FIG. 1) is fabricated and, then, the optical waveguide modulator 1 is connected to a waveform monitoring device such as an oscilloscope. Then, the block 22 is attached to a portion on the side face of the waveguide substrate 2. Thereafter, while the intensity modulated waveform of the light signal output from the optical waveguide modulator 1 is monitored with the waveform monitoring device, mechanical stress is applied to the block 22, and when the waveform of the light signal takes on a desired waveform, the block 22 is fixed up such that the mechanical stress at that time is maintained. Thus, the optical waveguide modulator 1F as described above can be obtained, and therefrom, the same effects as obtained from the above described optical waveguide modulator 1A can be obtained.

Although the refractive index of the first branch optical waveguide 3a was changed by means of the block 22 for applying stress in the above described optical waveguide modulator 1F, the block 22 may be fixed on the opposite side face of the waveguide substrate 2 so that the refractive index of the second branch optical waveguide 3b is changed.

Figure 10:
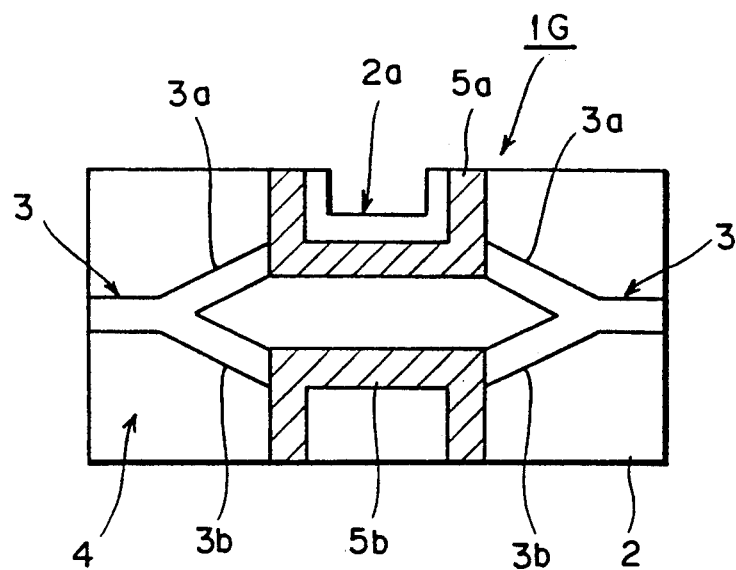
FIG. 10 is a plan view of an optical waveguide modulator for explaining an operating point trimming method as a seventh embodiment of the present invention.

Now, referring to FIG. 10, a seventh embodiment of the present invention will be described. FIG. 10 is a plan view showing the structure of an optical waveguide modulator 1G according to the seventh embodiment of the present invention, in which parts corresponding to the parts in the prior art example shown in FIG. 1 are denoted by like reference numerals. Accordingly, explanation thereof will be omitted.

As shown in FIG. 10, the point of the optical waveguide modulator 1G according to the seventh embodiment differing from that of the conventional optical waveguide modulator 1 is that a part at the side of the waveguide substrate 2 is cut off and an indented portion 2a is formed there so that the stress exerting on the first branch optical waveguide 3a is changed, whereby the refractive index of the first branch optical waveguide 3a is changed and the optical path difference between the same and the second branch optical waveguide 3b is adjusted, and thus the trimming for bringing the operating point of the optical waveguide modulator 1G to a desired operating point is achieved, and the need for applying the DC bias voltage for compensating for the DC offset described as related to the prior art example is eliminated.

More specifically, in performing such operating point trimming, the optical waveguide modulator 1 (refer to FIG. 1) is fabricated and, then, the optical waveguide modulator 1 is connected to a waveform monitoring device such as an oscilloscope. Then, while the intensity modulated waveform of the light signal output from the optical waveguide modulator 1 is monitored with the waveform monitoring device, a portion at the side of the waveguide substrate 2 is cut off by grinding and the indented portion 2a is formed there until the waveform of the light signal takes on a desired waveform. Thus, the optical waveguide modulator 1G as described above can be obtained, and therefrom, the same effects as obtained from the above described optical waveguide modulator 1A can be obtained.

The portion to be cut off may be anywhere at the side of the waveguide substrate 2 provided that the refractive index of either of the branch optical waveguides 3a and 3b is changed and an optical signal with a predetermined intensity modulated waveform is thereby obtained.

Figure 11:
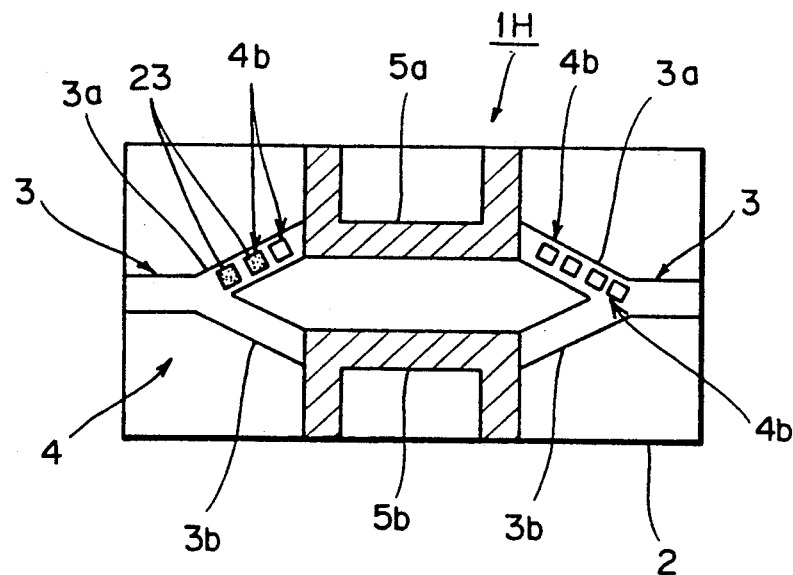
FIG. 11 is a plan view of an optical waveguide modulator for explaining an operating point trimming method as an eighth embodiment of the present invention.

Now, referring to FIG. 11, an eighth embodiment of the present invention will be described. FIG. 11 is a plan view showing the structure of an optical waveguide modulator 1H according to the eighth embodiment of the present invention, in which parts corresponding to the parts in the prior art example shown in FIG. 1 are denoted by like reference numerals. Accordingly, explanation thereof will be omitted.

As shown in FIG. 11, the point of the optical waveguide modulator 1H according to the eighth embodiment differing from that of the conventional optical waveguide modulator 1 is that a plurality of portions 4b, 4b, . . . of the buffer layer 4 over the first branch optical waveguide 3a are removed and then a material 23 with a different refractive index from that of the optical waveguide 3 is mounted on the portions 4b, 4b, . . . at which the buffer layer 4 is removed, whereby the refractive index of the first branch optical waveguide 3a is changed and the optical path difference between the same and the second branch optical waveguide 3b is adjusted, and thus the trimming for bringing the operating point of the optical waveguide modulator 1H to a desired operating point is achieved, and the need for applying the DC bias voltage for compensating for the DC offset described as related to the prior art example is eliminated.

More specifically, in performing this operating point trimming, the optical waveguide modulator 1 (refer to FIG. 1) is fabricated and, then, the buffer layer 4 is removed by etching or a similar method at a plurality of portions 4b, 4b, . . . thereof over the first branch optical waveguide 3a. Then, the optical waveguide modulator 1 with the portions 4b, 4b, . . . of the buffer layer 4 removed is connected to a waveform monitoring device such as an oscilloscope. Thereafter, while the intensity modulated waveform of the light signal output from the optical waveguide modulator is monitored with the waveform monitoring device, a material 23 with a different refractive index from that of the optical waveguide 3 is mounted on the portions 4b, 4b, . . . at which the buffer layer 4 is removed, one after another, until the waveform of the light signal takes on a desired waveform. Thus, the optical waveguide modulator 1H as described above can be obtained, and therefrom, the same effects as obtained from the above described optical waveguide modulator 1A can be obtained.

Although, in the described optical waveguide modulator 1H, portions 4b, 4b, . . . of the buffer layer 4 over the first branch optical waveguide 3a were removed and the material 23 was mounted on these portions, it may also be well to have portions of the buffer layer 4 over the second branch optical waveguide 3b removed and have the material 23 mounted on these portions. That is, the portions to be removed may be over either of the branch optical waveguides 3a and 3b except the portions at which the electrodes 5a and 5b are formed. The same as in the previous embodiment, the portions to which the method according to the present embodiment is applied may be anywhere surrounding the branch optical waveguide 3a or 3b provided that the refractive index of either of the branch optical waveguides 3a and 3b is thereby changed.

Figure 12:
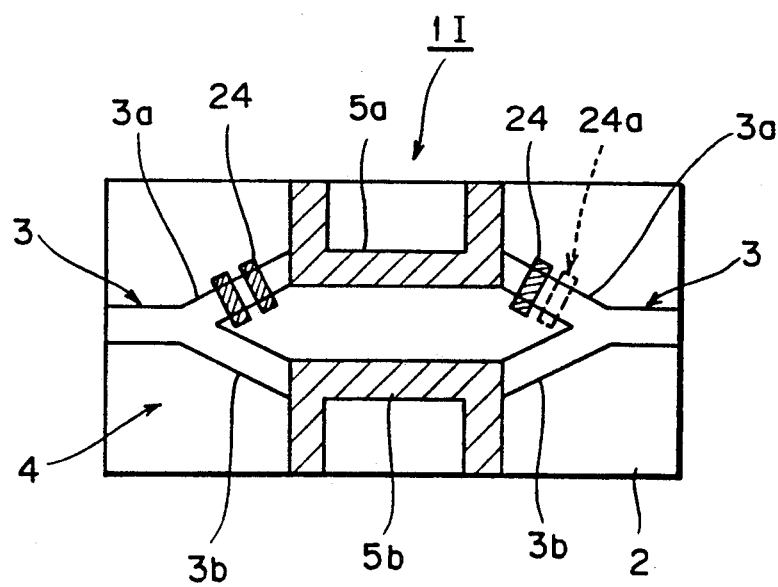
FIG. 12 is a plan view of an optical waveguide modulator for explaining an operating point trimming method as a ninth embodiment of the present invention.

Now, referring to FIG. 12, a ninth embodiment of the present invention will be described. FIG. 12 is a plan view showing the structure of an optical waveguide modulator 1I according to the ninth embodiment of the present invention, in which parts corresponding to the parts in the prior art example shown in FIG. 1 are denoted by like reference numerals. Accordingly, explanation thereof will be omitted.

As shown in FIG. 12, the point of the optical waveguide modulator 1I according to the ninth embodiment differing from that of the conventional optical waveguide modulator 1 is that a plurality of metallic films 24, 24, . . . are formed on the buffer layer 4 over the first branch optical waveguide 3a and then the metallic films 24, 24, . . . are removed one after another as indicated by the frame 24a drawn by the broken line, whereby the refractive index of the first branch optical waveguide 3a is changed and the optical path difference between the same and the second branch optical waveguide 3b is adjusted, and thus the trimming for bringing the operating point of the optical waveguide modulator 1I to a desired operating point is achieved, and the need for applying the DC bias voltage for compensating for the DC offset described as related to the prior art example is eliminated.

More specifically, in performing such operating point trimming, the optical waveguide modulator 1 (refer to FIG. 1) is fabricated and, then, a metallic material is deposited by evaporation on the buffer layer 4 over a plurality of positions of the first branch optical waveguide 3a and the plurality of metallic films 24, 24, . . . are thereby formed. Then, the optical waveguide modulator with the plurality of metallic films 24, 24, . . . formed thereon is connected to a waveform monitoring device such as an oscilloscope. Thereafter, while the intensity modulated waveform of the light signal output from the optical waveguide modulator is monitored with the waveform monitoring device, the plurality of metallic films 24, 24, . . . are removed one after another by such a method as throwing a laser beam thereon until the waveform of the light signal takes on a desired waveform. Thus, the optical waveguide modulator 1I as described above can be obtained, and therefrom, the same effects as obtained from the above described optical waveguide modulator 1A can be obtained.

Although, in the described optical waveguide modulator 1I, the metallic films 24, 24, ... were formed over the first branch optical waveguide 3a and then removed one after another, they may be formed over the second branch optical waveguide 3b instead.

Figure 13:
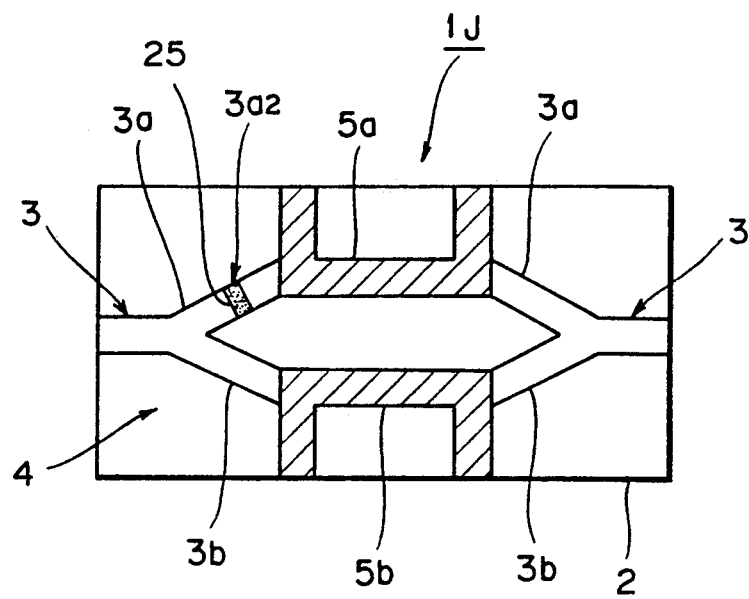
FIG. 13 is a plan view of an optical waveguide modulator for explaining an operating point trimming method as a tenth embodiment of the present invention.

Now, referring to FIG. 13, a tenth embodiment of the present invention will be described. FIG. 13 is a plan view showing the structure of an optical waveguide modulator 1J according to the tenth embodiment of the present invention, in which parts corresponding to the parts in the prior art example shown in FIG. 1 are denoted by like reference numerals. Accordingly, explanation thereof will be omitted.

As shown in FIG. 13, the point of the optical waveguide modulator 1J according to the tenth embodiment differing from that of the conventional optical waveguide modulator 1 is that a material 25 with a different refractive index from the refractive index of the first branch optical waveguide 3a is filled into a gap portion $3a_2$ formed in a portion of the first branch optical waveguide 3a, whereby the refractive index of the first branch optical waveguide 3a is changed and the optical path difference between the same and the second branch optical waveguide 3b is adjusted, and thus the trimming for bringing the operating point of the optical waveguide modulator 1J to a desired operating point is achieved, and the need for applying the DC bias voltage for compensating for the DC offset described as related to the prior art example is eliminated.

More specifically, to perform such operating point trimming, first, before Ti is thermally diffused for forming the optical waveguide 3 of the optical waveguide modulator 1 (refer to FIG. 1), a predetermined pattern is formed with a resist or the like, so that the desired gap portion $3a_2$ may be formed, in a portion of the path along which the first branch optical waveguide 3a is to be formed, and then, Ti is thermally diffused and the optical waveguide 3 is thereby formed. Then, the buffer layer 4 and the electrodes 5a, 5b are formed in succession and, finally, the resist is removed. The portion at which the resist is removed becomes the gap portion $3a_2$. Thus, an optical waveguide modulator having the first branch optical waveguide 3a with the gap portion $3a_2$ formed therein is fabricated. Then, the optical waveguide modulator is connected to a waveform monitoring device such as an oscilloscope. Thereafter, while the intensity modulated waveform of the light signal output from the optical waveguide modulator is monitored with the waveform monitoring device, the material 25 having a different refractive index from the refractive index of the first branch optical waveguide 3a is filled into the gap portion $3a_2$ until the waveform of the light signal takes on a desired waveform. Thus, the optical waveguide modulator 1J as described above can be obtained, and therefrom, the same effects as obtained from the above described optical waveguide modulator 1A can be obtained.

Although, in the described optical waveguide modulator 1J, the material 25 was filled into the first branch optical waveguide 3a, it may be filled into the second branch optical waveguide 3b instead.

As the method for forming the gap portion $3a_2$, it may also be applicable to remove a portion of the first or second branch optical waveguide by etching or a similar method after the optical waveguide modulator 1 has been fabricated.

While, in all the above described first to tenth embodiments, the trimming was performed while the waveform of the output intensity modulated light signal is monitored by having the optical waveguide modulator connected to a waveform monitoring device, it is preferred that the optical waveguide modulator is arranged in a module by being fixed to a device such as a metallic box with a drive circuit and other peripheral circuits incorporated therein and the thus modularized optical waveguide modulator is connected to a waveform monitoring device and, thereupon, the trimming as described in the first to tenth embodiments is performed.

Although the operating point trimming methods described above as related to the first to tenth embodiments were all such that are performed to optical waveguide modulators whose branch optical waveguides are of the same length, it is possible, even if they are applied to an optical waveguide modulator whose branch optical waveguides are different in length, to achieve matching of the light beams joining together after propagating through the waveguides.

Figure 14:
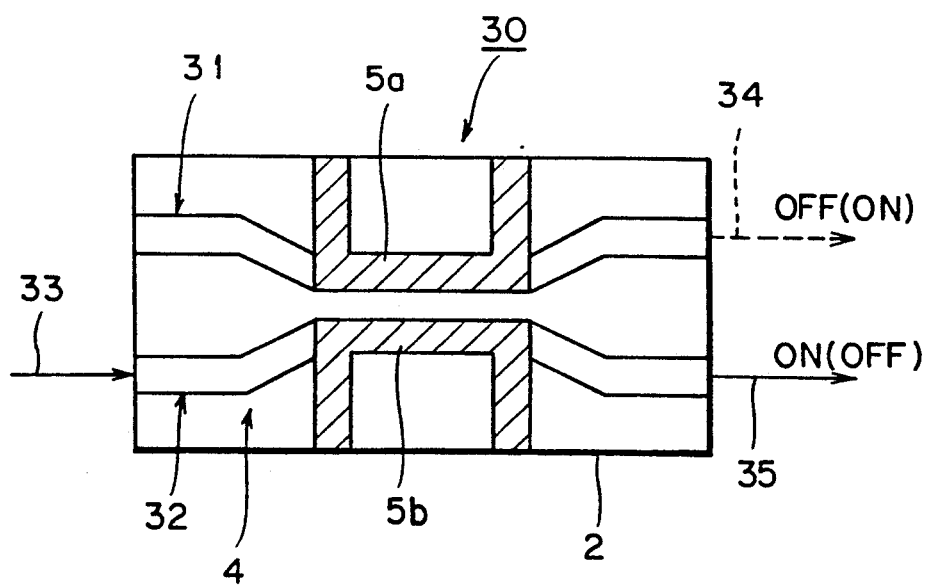
FIG. 14 is a plan view of an optical waveguide switch to which the operating point trimming method according to the present invention is suitably applicable.

Further, the operating point trimming methods described above as related to the first to tenth embodiments can also be applied to an optical waveguide switch 30 of a direction coupling type as shown in FIG. 14.

The optical waveguide switch 30 will be briefly described here. The optical waveguide switch 30 shown in FIG. 14 is arranged to have virtually equal form to the optical waveguide modulator 1, only differing therefrom is that first and second optical waveguides 31 and 32 independent of each other are formed on the waveguide substrate 2. The first and second optical waveguides 31 and 32 have a portion where they are arranged in parallel and provided with their respective electrodes 5a and 5b mounted thereon, and there, it is adapted such that a light beam is transferred from one optical waveguide to the other by an optical interaction. For example, as shown in the same figure, a light beam 33 introduced into the second optical waveguide 32 can be transferred to the first optical waveguide 31. Further, by applying predetermined voltages to the electrodes 5a and 5b, thereby changing the strengths of electric fields, and hence the refractive indexes of the optical waveguides 31 and 32, it is made possible to arrange such that a light beam 33 introduced into the second optical waveguide 32 is completely coupled with the first optical waveguide 31 and a light beam 34 is thereby output from the first optical waveguide 31, while no light beam is allowed to output from the second optical waveguide 32, or, conversely, such that the light beam 35 is output from the second optical waveguide 32, while no light beam is allowed to output from the first optical waveguide 31. That is, the switch can perform switching such that each of the light beams 34 and 35 is turned on/off.

According to the present invention, as described above, since it is made possible to form optical waveguide modulators and optical waveguide switches having a desired operating point, the operating point shift can be suppressed. Consequently, the need for applying the DC bias voltage for compensating for the DC offset can be eliminated. Since the DC bias voltage need not be applied, no DC drift is produced. Because of such advantages gained from the present invention, a proper light signal can be obtained.

Further, since the operating point can be set as desired, it becomes possible to fabricate products with a steady operating point and to thereby greatly improve the yield rate of the products.

What is claimed is:

1. An operating point trimming method for an optical waveguide modulator, said optical waveguide modulator including a waveguide substrate, a first and a second branch optical waveguide formed on said substrate, a buffer layer covering said first and second branch optical waveguides, and a first and a second electrode respectively mounted on said first and second branch optical waveguides, and adapted such that a voltage from a voltage source applied between said first and second electrodes is varied so that a phase difference is produced between light beams propagating through said first and second branch optical waveguides and the light beams having the phase difference therebetween are combined to be output as an intensity modulated light beam, said operating point trimming method comprising the steps of:

monitoring the waveform of said intensity modulated light beam; and removing, while monitoring the waveform, said buffer layer over a portion of either one of said first and second branch optical waveguides, with one of said first and second electrodes not mounted thereon, such that the waveform of said intensity modulated light beam takes on a desired waveform.

2. An operating point trimming method for an optical waveguide modulator, said optical waveguide modulator including a waveguide substrate, a first and a second branch optical waveguide formed on said substrate, a buffer layer covering said first and second branch optical waveguides, and a first and a second electrode respectively mounted on said first and second branch optical waveguides, and adapted such that a voltage from a voltage source applied between said first and second electrodes is varied so that a phase difference is produced between light beams propagating through said first and second branch optical waveguides and the light beams having the phase difference therebetween are combined to be output as an intensity modulated light beam, said operating point trimming method comprising the steps of:

monitoring the waveform of said intensity modulated light beam; and heating while monitoring the waveform, a portion of either one of said first and second branch optical waveguides, with one of said first and second electrodes not mounted thereon, through said buffer layer, thereby deforming said portion such that the waveform of said intensity modulated light beam takes on a desired waveform.

3. An operating point trimming method for an optical waveguide modulator, said optical waveguide modulator including a waveguide substrate, a first and a second branch optical waveguide formed on said substrate, a buffer layer covering said first and second branch optical waveguides, and a first and a second electrode respectively mounted on said first and second branch optical waveguides, and adapted such that a voltage from a voltage source applied between said first and second electrodes is varied so that a phase difference is produced between light beams propagating through said first and second branch optical waveguides and the light beams having the phase difference therebetween are combined to be output as an intensity modulated light beam, said operating point trimming method comprising the steps of:

attaching a stress applying block to a side face of said waveguide substrate;

applying, while monitoring the waveform of said intensity modulated light beam, a mechanical stress to said block such that the waveform of said intensity modulated light beam takes on a desired waveform; and fixing up said block in a state maintaining the stress.

4. An operating point trimming method for an optical waveguide modulator, said optical waveguide modulator including a waveguide substrate, a first and a second branch optical waveguide formed on said substrate, a buffer layer covering said first and second branch optical waveguides, and a first and a second electrode respectively mounted on said first and second branch optical waveguides, and adapted such that the voltage from a voltage source applied between said first and second electrodes is varied so that a phase difference is produced between light beams propagating through said first and second branch optical waveguides and the light beams having the phase difference therebetween are combined to be output as an intensity modulated light beam, said operating point trimming method comprising the steps of:

monitoring the waveform of said intensity modulated light beam; and cutting off, while monitoring the waveform, a portion at a side of said waveguide substrate such that the waveform of said intensity modulated light beam takes on a desired waveform.

5. An operating point trimming method for an optical waveguide switch including a waveguide substrate, a first and a second optical waveguide formed on said substrate independently of each other, a buffer layer covering said first and second optical waveguides, and a first and a second electrode respectively mounted on said first and second optical waveguides, said operating point trimming method comprising the steps of:

monitoring the waveforms of output light beams of said first and second optical waveguides; and removing, while monitoring the waveforms, said buffer layer over a portion of either one of said first and second optical waveguides, with one of said first and second electrodes not mounted thereon.

6. An operating point trimming method for an optical waveguide switch including a waveguide substrate, a first and a second optical waveguide formed on said substrate independently of each other, a buffer layer covering said first and second optical waveguides, and a first and a second electrode respectively mounted on said first and second optical waveguides, said operating point trimming method comprising the steps of:

monitoring the waveforms of output light beams of said first and second optical waveguides; and heating, while monitoring the waveforms, a portion of either one of said first and second optical waveguides, with one of said first and second electrodes not mounted thereon, through said buffer layer, thereby deforming said portion.

7. An operating point trimming method for an optical waveguide switch including a waveguide substrate, a first and a second optical waveguide formed on said substrate independently of each other, a buffer layer covering said first and second optical waveguides, and a first and a second electrode respectively mounted on said first and second optical waveguides, said operating point trimming method comprising the steps of:

attaching a stress applying block to a side face of said waveguide substrate;

applying, while monitoring the waveforms of output light beams of said first and second optical waveguides, a mechanical stress to said block; and fixing up said block in a state maintaining the stress.

8. An operating point trimming method for an optical waveguide switch including a waveguide substrate, a first and a second optical waveguide formed on said substrate independently of each other, a buffer layer covering said first and second optical waveguides, and a first and a second electrode respectively mounted on said first and second optical waveguides, said operating point trimming method comprising the steps of:

monitoring the waveforms of output light beams of said first and second optical waveguides; and cutting off, while monitoring the waveforms, a portion at a side of said waveguide substrate.

9. An optical waveguide modulator, comprising:

a waveguide substrate;

a first and a second branch optical waveguide formed on said substrate;

a buffer layer covering said first and second branch optical waveguides;

first and second electrode means respectively mounted on said first and second branch optical waveguides for receiving a voltage from a voltage source between said first and second electrode means, said voltage being varied so that a phase difference is produced between light beams propagating through said first and second branch optical waveguides and the light beams having the phase difference therebetween are combined to be output as an intensity modulated light beam; and said buffer layer having an exposure hole in which a portion of said buffer layer which is over a portion of either one of said first and second branch optical waveguides, with one of said first and second electrode means not mounted thereon, is removed such that the waveform of said intensity modulated light beam takes on a desired waveform.

10. An optical waveguide modulator, comprising:

a waveguide substrate;

a first and a second branch optical waveguide formed on said substrate;

a buffer layer covering said first and second branch optical waveguides;

first and second electrode means respectively mounted on said first and second branch optical waveguides for receiving a voltage from a voltage source between said first and second electrode means, said voltage being varied so that a phase difference is produced between light beams propagating through said first and second branch optical waveguides and the light beams having the phase difference therebetween are combined to be output as an intensity modulated light beam; and said waveguide substrate having a removed portion in which a portion at one side of said waveguide substrate is cut off.

11. An optical waveguide switch, comprising:

a waveguide substrate;

a first and a second optical waveguide formed on said substrate;

a buffer layer covering said first and second optical waveguides;

a first and a second electrode respectively mounted on said first and second optical waveguides; and said buffer layer having an exposure hole in which a portion of said buffer layer which is over a portion of either one of said first and second optical waveguides, with one of said first and second electrode means not mounted thereon, is removed so as to trim an operating point of the switch.

12. An optical waveguide switch, comprising:

a waveguide substrate;

a first and a second optical waveguide formed on said substrate;

a buffer layer covering said first and second optical waveguides;

a first and a second electrode respectively mounted on said first and second optical waveguides; and said waveguide substrate having a removed portion in which a portion at one side of said waveguide substrate is cut off.

* * * * *